United States Patent [19]

Nakamura et al.

[11] Patent Number: 5,013,519
[45] Date of Patent: May 7, 1991

[54] AUTONOMOUS, DECENTRALIZED FAST BREEDER REACTOR SYSTEM

[75] Inventors: Hisashi Nakamura; Hideo Sakaba; Kunihiko Yokoyama; Hitoshi Hayashida; Toshio Yatabe; Makinori Ikeda; Hiroaki Ohhira; Naoyuki Kisohara; Minoru Gunji; Satoru Nakai; Akira Ohtaki, all of Oarai, Japan

[73] Assignee: Doryokuro Kakunenryo Kaihatsu Jigyodan, Tokyo, Japan

[21] Appl. No.: 472,142

[22] Filed: Jan. 30, 1990

[30] Foreign Application Priority Data

Jan. 31, 1989 [JP] Japan .................................. 1-23371

[51] Int. Cl.$^5$ .............................................. G21G 1/06
[52] U.S. Cl. .................... 376/179; 376/244; 376/273; 376/282; 376/404; 376/405; 376/406; 376/911
[58] Field of Search ............... 376/911, 910, 273, 179, 376/402, 403, 404, 405, 406, 212, 213

[56] References Cited

U.S. PATENT DOCUMENTS

| | | | |
|---|---|---|---|
| 3,366,545 | 1/1968 | Lewis et al. | 176/28 |
| 3,406,091 | 10/1968 | Mackay | 176/28 |
| 3,580,803 | 5/1971 | Everson et al. | 176/28 |
| 4,124,064 | 11/1978 | Jabsen et al. | 165/69 |
| 4,732,729 | 3/1988 | Amano et al. | 376/176 |

Primary Examiner—Brooks H. Hunt
Assistant Examiner—N. Bhat
Attorney, Agent, or Firm—Armstrong, Nikaido, Marmelstein, Kubovcik & Murray

[57] ABSTRACT

An autonomous, decentralized fast breeder reactor includes a single reactor main vessel which houses a plurality of small-size reactor subsystems each having a small-scale fast breeder reactor core, and a plurality steam generator subsystems. These subsystems function in an autonomous manner and are caused to undergo a heat transfer with one another by a coolant circulating naturally through the interior of the main vessel, thereby constructing a cooperatively operating system. Steam generated by the steam generators is introduced to a turbine system and utilized in generating electricity. The condensate from the turbines is cooled by a heat accumulating pool, and the heat is utilized in a separate system. The entire system is installed underground and use is made of the difference in elevation. Use also is made of solid bedrock to construct a housing facility for the reactor.

5 Claims, 6 Drawing Sheets

AUTONOMOUS, DECENTRALIZED FAST BREEDER REACTOR SYSTEM

BACKGROUND OF THE INVENTION

This invention relates to a fast breeder reactor system capable of supplying a thermal/electrical output corresponding to the required scale. More particularly, the invention relates to an autonomous, decentralized fast breeder reactor system suited also to an underground site.

Owing to the basic characterizing feature of a fast breeder reactor, namely the fact that fast neutrons are used in production of fission energy and in the breeding of fuel, the breeder has a dense core. Accordingly, in a larger scale power reactor, it is necessary to take a change in core reactivity into consideration in order to accumulate a larger volume of fuel within the core. In this connection, an inherent safety mechanism peculiar to fast breeder reactors is required. For example, since reactivity is controlled so as to be negative by a Doppler change or the like, core safety is maintained at a high level. However, in order to assure the reliability of these mechanisms, design limitations are imposed upon the core structure and control, etc. For example, a flat core structure, a structure which allows core expansion, or control for leveling core neutron flux is necessary. These limitations will not be solved merely by reducing the size of the core. There is a need to realize a universally applicable optimum nuclear reactor system in which rationalization of design is achieved based on a harmonious balance between safety and economy.

SUMMARY OF THE INVENTION

An object of the present invention is to provide an autonomous, decentralized fast breeder reactor system which operates in an autonomous manner while exhibiting a high degree of safety and reliability, and wherein scale of power can be varied easily in conformity with demand and application.

In order to attain the foregoing object, the present invention provides an autonomous, decentralized fast breeder reactor system characterized in that a plurality of small-size nuclear reactor subsystems each having a small-scale faster breeder reactor core and a plurality of steam generator subsystems are disposed in a single main vessel of a nuclear reactor, and a heat transfer is made to take place between each nuclear reactor subsystem and each steam generator subsystem by a coolant circulating naturally through the interior of the main vessel of the nuclear reactor and undergoing a heat exchange with a coolant circulating naturally through the interior of each nuclear reactor subsystem.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described with reference to the drawings.

Figure 1:
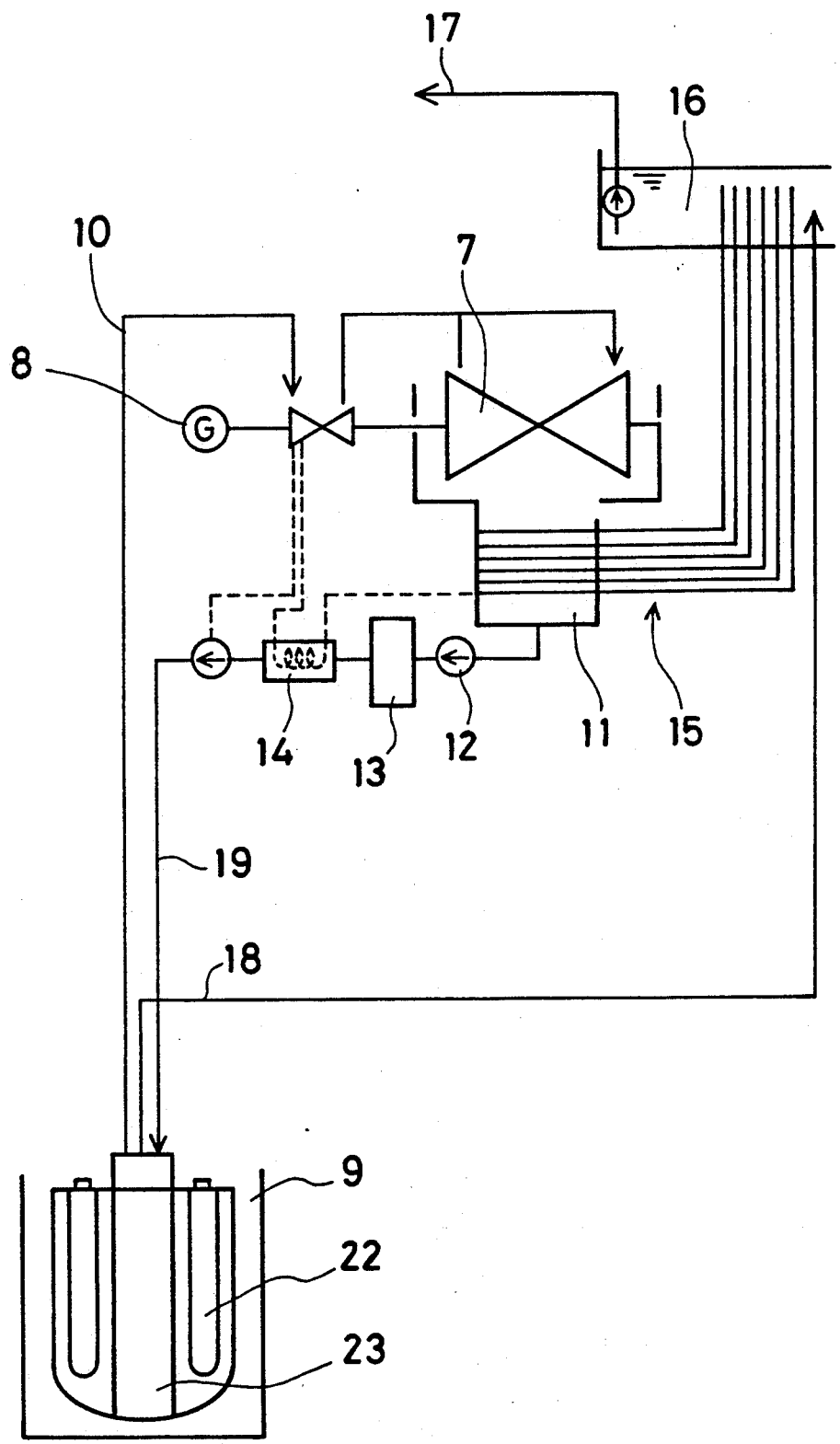
FIG. 1 is a diagram illustrating an embodiment of a decentralized fast breeder reactor energy supply plant according to the present invention.
Figure 2A:
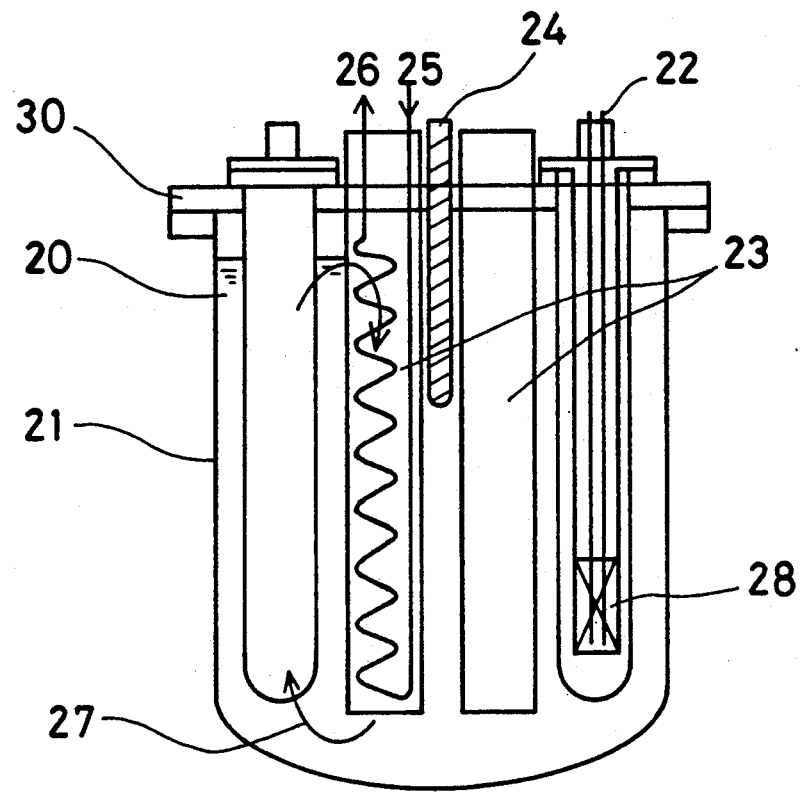
FIG. 2 shows an embodiment of a decentralized fast breeder reactor according to the present invention, in which (A) is a longitudinal sectional view and (B) a plan view.
Figure 2B:
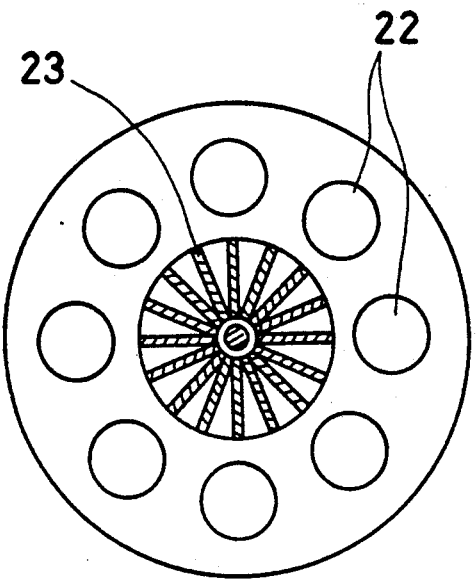
Figure 3:
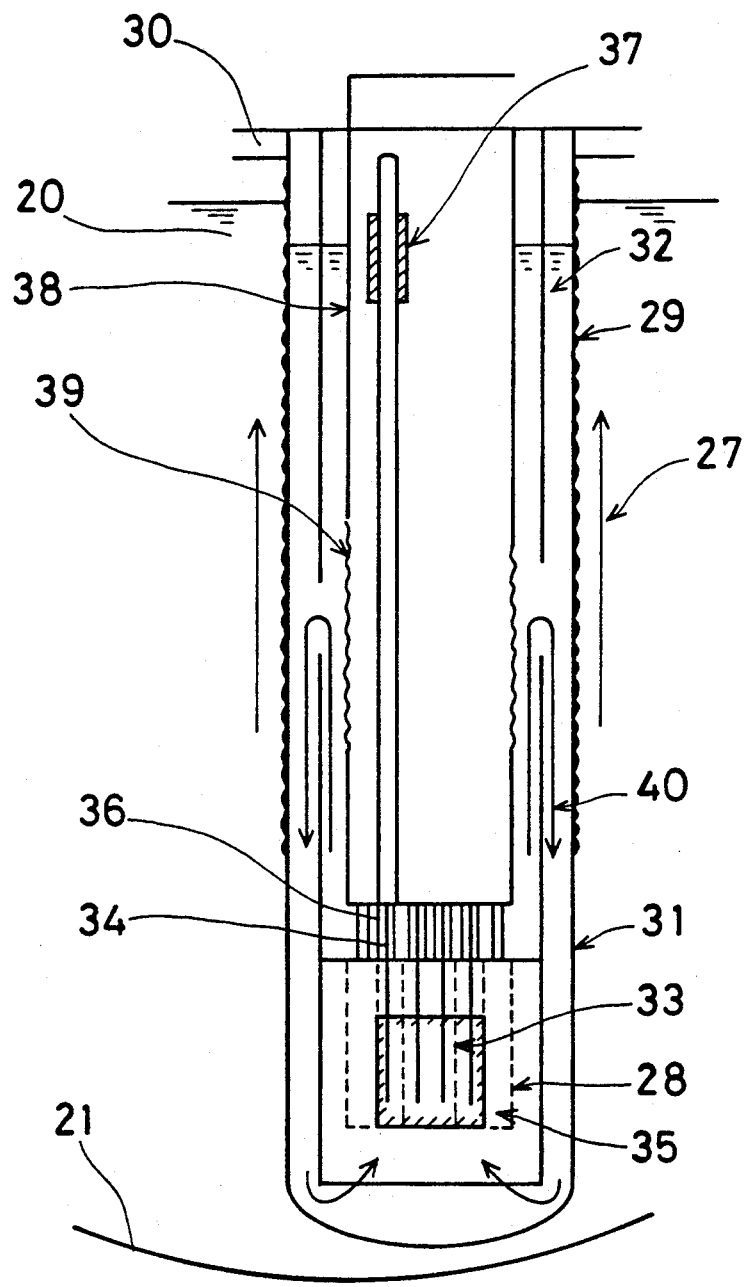
FIG. 3 is a diagram showing an embodiment of a unit-type fast breeder reactor.
Figure 4B:
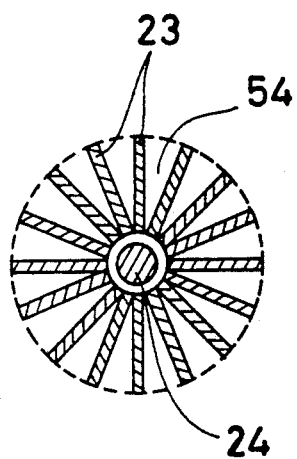
FIG. 4 shows an embodiment of a cartridge type steam generator, in which (A) is a longitudinal sectional view, (B) a plan view and (C) a view showing a steam generator element as seen from above.
Figure 4A:
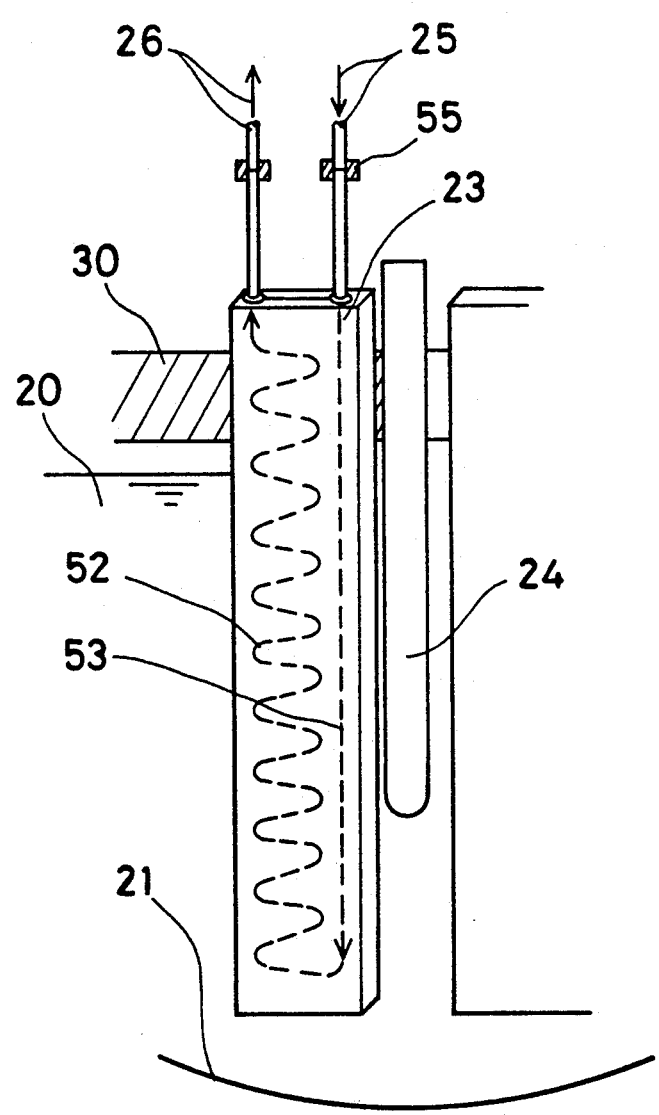
Figure 4C:
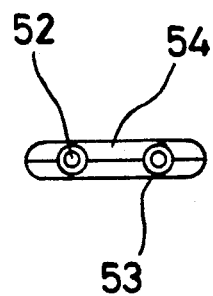

FIG. 1 is a diagram illustrating an embodiment of an autonomous, decentralized fast breeder reactor system according to the present invention, FIG. 2 shows an embodiment of an autonomous, decentralized fast breeder reactor according to the present invention, in which (A) is a longitudinal sectional view and (B) a plan view, FIG. 3 is a diagram showing an embodiment of a unit-type fast breeder reactor, and FIG. 4 shows an embodiment of a cartridge-type steam generator, in which (A) is a longitudinal sectional view, (B) a plan view and (C) a view showing a steam generator element as seen from above. Depicted in these drawings are a turbine 7, a generator 8, a self-regulating, dispersed-type breeder reactor 9, a steam line 10, a condenser 11, a condensate pump 12, a condensate desalinating device 13, a heater 14, heat pipes 15, a heat accumulating pool 16, heat supply piping 17, a direct cooler fan 18, a feedwater line 19, sodium 20, a main vessel 21 of the reactor, a unit-type nuclear reactor 22, cartridge-type steam generators 23, a direct core cooling device 24, feedwater 25, steam 26, natural circulatory flow 27, a core 28, a heat exchange element 29, an upper deck 30 of the main vessel of the reactor, a unit-type reactor vessel 31, sodium 32, a core fuel assembly 33, control rods 34, a blanket assembly 35 for breeding, a fuel supply support rod 36, a control rod drive mechanism 37, a core support mechanism 38, a core support mechanism bellows 39, natural circulatory flow 40, a heat transfer pipe 52, a downcomer 53, a heat transfer plate 54, and a gray lock 55.

In the autonomous, decentralized fast breeder reactor according to the present invention, generated steam from the fast breeder reactor 9 is introduced to the turbine 7 through the steam line 10 to operate the generator 8, as shown in FIG. 1. The steam which has passed through the turbine 7 is condensed by the condenser 11, where heat is exhausted. The resulting condensate is passed through the condensate desalinating device 13 by the condensate pump 12, pressurized and then returned to the breeder reactor 9 through the heater 14 and feedwater line 19. The heat exhausted in the condenser 11 is transferred to the large-capacity heat accumulating pool 16 using the heat pipes 15. The heat in heat accumulating pool 16 is supplied by the heat supply piping 17. The direct cooler line 18 is connected between the heat accumulating pool 16 and the fast breeder reactor 9.

As shown in FIG. 2, the autonomous, decentralized fast breeder reactor 9 includes a plurality of the unit-type reactors 22 each having a small-scale fast breeder core. The unit-type breeder reactors 22 are disposed along the inner periphery of the main vessel 21 of the reactor accommodating the sodium 20 serving as the coolant, and each is an individual subsystem which functions in an autonomous manner. The cartridge type steam generators 23 are radially arranged on the inner side of the unit-type reactors 22, and these similarly define individual subsystems which function in an autonomous manner. Heat transfer takes place among the subsystems owing to natural circulation of the sodium caused by a temperature differential, as will be described below. As a result, each subsystem operates in cooperation with the others to form a system. The direct core cooling device 24 is disposed at the center of the breeder reactor.

As shown in FIG. 3, each unit-type reactor 22 is mounted to the upper deck 30 of the main vessel 21, and a plurality of these reactors 22 are decentralized within the vessel 21 in the manner shown in FIG. 2(B). The core 28 of each unit-type reactor vessel 31 is constituted by the core fuel assemblies 33, the breeding blanket assembly 35, and the control rods 34. The core fuel assemblies 33 are suspended from the fuel assembly support rods 36 every six or seven assemblies, and the control rods 34 are situated at the centers thereof to form a cartridge that can be readily detached. The control rods 34 are moved up and down by the overlying control rod drive mechanism 37 to primarily control the change in reactivity. The core support mechanism 38 is provided with the core support mechanism bellows 39 in such a manner that thermal expansion due to the effects of temperature change at the core exit can readily be eliminated. This expansion is greater than the change in the expansion of the unit-type reactor vessel 31, and it is so arranged that the control rods 34 will not be pulled out of the core 28 owing to the relative thermal expansion between the control rods and the core.

The heat exchange element 29 is provided on the outer periphery of the unit-type reactor vessel 31 and is arranged within the reactor main vessel 21 at the lower part thereof along with the heat producing core 28 so that natural circulation of the coolant may readily take place. Accordingly, the arrangement incorporates the abovementioned inherent safety mechanism, namely the suppression of core reactivity by thermal expansion, in which the unit-type reactor vessel 31 is comparatively long, and the fuel assemblies 33, blanket assembly 35 and control rods 34 of the core 28 also utilize this length.

The sodium 32 within the unit-type reactor vessel 31 heated in the core 28 rises owing to buoyancy, thereby forming the natural circulatory flow 40. The sodium 32 transfers heat to the sodium 20 in the reactor main vessel 21 via the heat exchange element 29 of the unit-type reactor vessel 31 and therefore is cooled, and the natural circulatory flow 27 is formed inside the reactor main vessel 21. Thus, each unit-type reactor functions in an autonomous manner owing to the natural circulation of the sodium 32 and defines a subsystem.

As shown in FIG. 2(B), the cartridge-type steam generators 23 are arranged radially in such a manner that two or three of these steam generators correspond to one unit-type reactor.

As depicted in FIG. 4, each steam generator 23 has a plate-shaped configuration in which the plate-shaped heat transfer plates 54 embrace the heat transfer pipe 52, which has a hairpin-like configuration and weaves through the steam generator, and the downcomer 53 connected to the lower portion of the heat transfer pipe 52, thereby protecting the pipe 52 and the downcomer 53. The heat transfer plates 54 act as thermal conduction elements. The heat transfer plates 54, heat transfer pipe 52 and downcomer 53 are made of the same metal material. In addition, the heat transfer pipe 52 and the downcomer 53 possess a duplex tube structure in order to protect them against breakage. At the upper part of the steam generator, the heat transfer pipe 52 and the downcomer 53 are capable of being detachably connected to the external heat transfer pipe 52 and steam line 10, respectively, by means of the gray lock. Thus, each steam generator is readily replaceable in the form of a cartridge.

Voids in the heat transfer plates 54, heat transfer pipe 52 and downcomer 53 are filled with helium gas under pressure. By monitoring gas pressure, humidity and the like, a leakage detection function can be implemented for early discovery of breakage of the heat transfer pipe 52, downcomer 53 and heat transfer plate 54.

The feedwater of the steam generator is introduced downwardly by the downcomer 53 and, while rising in the heat transfer pipe 52, is converted into steam 26 owing to a heat exchange with the high-temperature sodium 20 via the heat transfer plate 54. By virtue of this heat exchange, the high-temperature sodium 20 drops in temperature to produce the downwardly directed natural circulatory flow 27 (FIG. 2). Further, since each steam generator is structured so as to depend from the upper deck 30 of the reactor main vessel 21, replacement is easy. Thus, each steam generator functions in an autonomous manner and defines a subsystem in the same way as the unit-type reactors.

Since the autonomous, decentralized fast breeder reactor has the foregoing structure, the heat generated in the core of the unit-type reactor subsystem is transferred to the sodium 20 inside the main vessel 2 of the reactor via the heat exchange element by means of the naturally circulating sodium 32, and further to each stream generator subsystem by natural circulation of the sodium 20. The steam produced by the steam generator subsystem is introduced to the turbine system where it is utilized to generate electricity.

The direct core cooling device 24 assures a heat-removal capability at the time of an emergency and is connected to the direct core cooling device line 18.

Even if, e.g., one of the unit type reactor subsystems has its function shut down in the breeder nuclear reactor system composed of the plural unit-type reactor subsystems and plural steam generator subsystems, the decay heat following shutdown of the nuclear reaction is reduced by natural circulatory cooling in cooperation with the other subsystems via the sodium in the main vessel of the nuclear reactor. As a result, even if there is partial subsystem failure, the function of the failed subsystem is borne by the other subsystems whose function continues to be maintained. Thus, an inherent safety structure is achieved in which destruction of the overall system is prevented. In addition, the structure is such that recovery from failure in a subsystem can be readily effected by replacing the failed unit or cartridge element. Moreover, since restoration is simplified, an automatic restoration operation by robot can readily be carried out.

The autonomous, decentralized fast breeder reactor of the present invention can be installed utilizing solid bedrock underground. In such case, the underground site will possess a structure offering sufficient protection against radiation and will have a sufficient head. As a result, cooling by natural circulation can be utilized.

Thus, as described above, the present system makes use of an inherent safety mechanism, control of nuclear reactivity corresponding to large-scale reactor power is facilitated by the decentralized arrangement of the type reactors, and reactivity control by natural circulatory cooling and core thermal expansion is employed in the unit reactors. Furthermore, by utilizing an underground site, the solid bedrock serves as a radiation barrier. Also, a reactor cooling system which relies upon natural circulation in the steam system can be achieved by utilizing the vertical head at the site. This inherent safety mechanism not only ensures safety in a plant to which the present system is applied but also simplifies control of plant operation. As a consequence, operation by robot is possible without a high degree of intelligence being required for operation of the plant.

Figure 5:
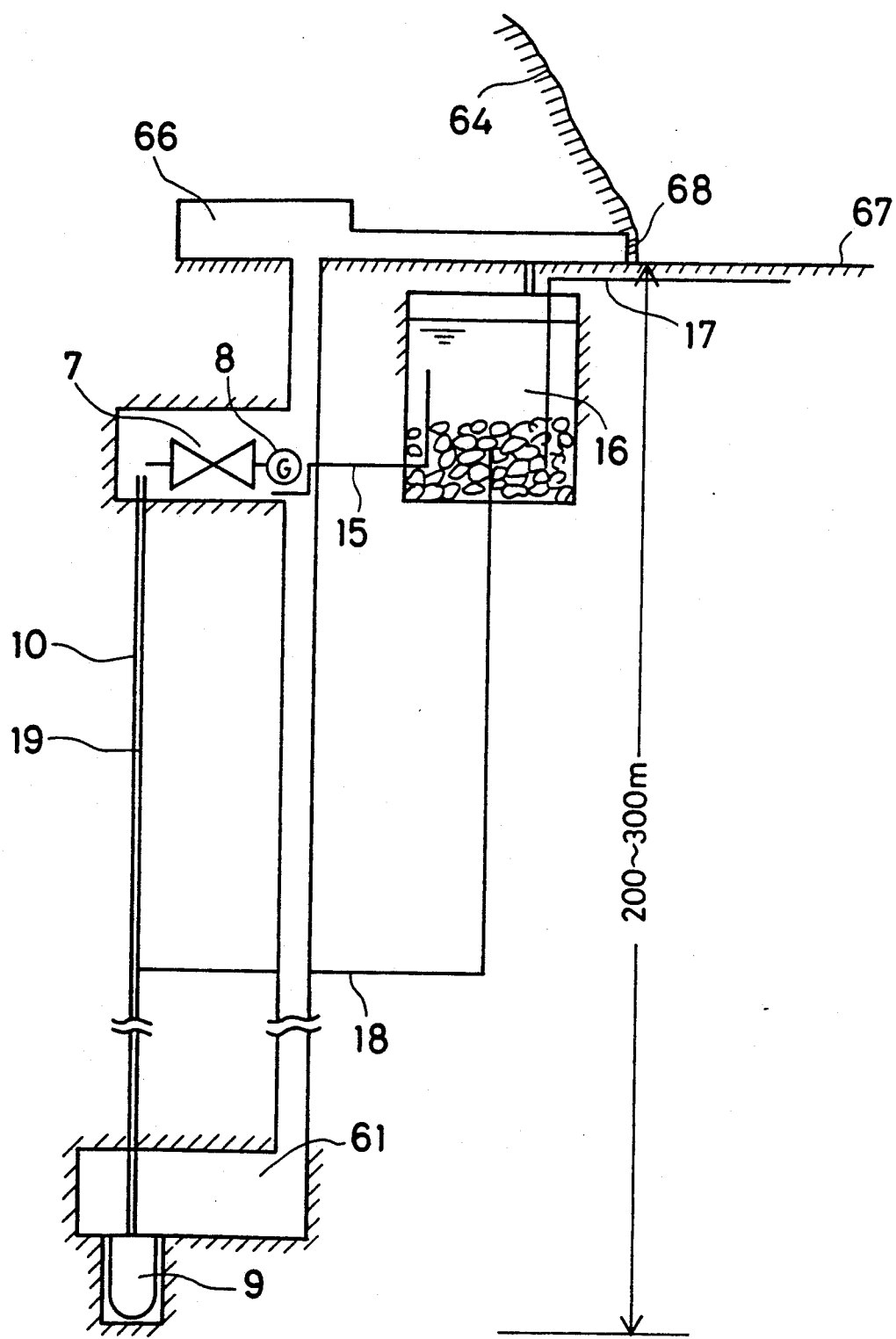
FIG. 5 is a conceptual view illustrating a dispersed-type fast breeder reactor energy supply plant at an underground site.
Figure 6:
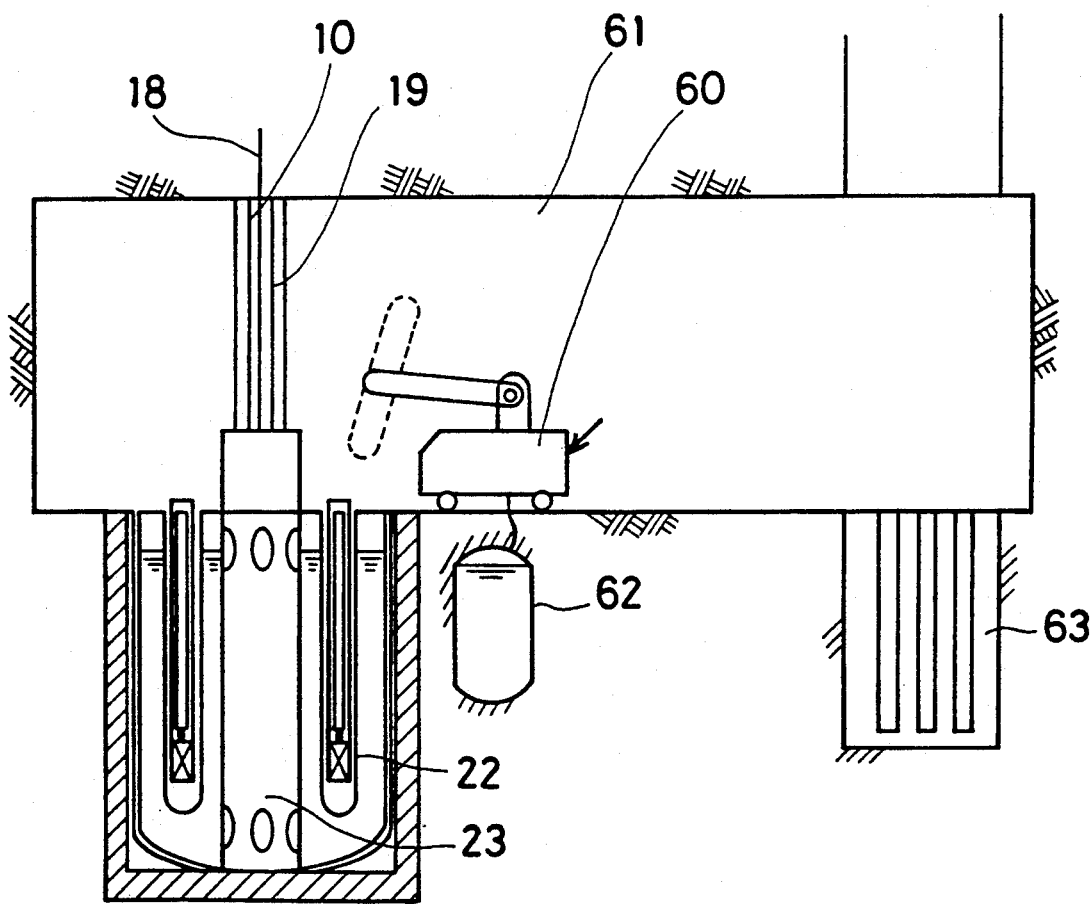
FIG. 6 is a schematic view showing the reactor system of FIG. 5.

FIG. 5 is a conceptual view illustrating an energy supply plant at an underground site to which the present invention is applied, and FIG. 6 is a schematic view showing the reactor system of FIG. 5. Numeral 60 denotes an industrial robot, 61 a working space, 62 a storage battery, 63 fuel depository, 64 bedrock, 66 a large-size closed space, 67 the surface of the ground, and 68 an entrance and exit.

The energy supply plant of this autonomous fast breeder reactor is installed underground utilizing the natural solid bedrock 64. At a depth underground of 200-300 m from the ground surface 67 or entrance and exit 68, the difference in elevation is used to produce a natural circulating force and alleviate the need for pumping. Protection against radiation, air-tightness, retention of radioactive substances and protection against earthquakes are provided by utilizing the bedrock. Furthermore, the large-size closed space 66 and the heat accumulating pool 16 having a large heat capacity are also provided. The heat supply piping 17 is laid from the heat accumulating pool to supply heat to a nearby city.

The nuclear reactor system operates by virtue of the autonomous cooperation among the subsystems. The measurement control system for reactor operation, though not described here, is implemented by artificial intelligence having autonomous cooPerativeness. Maintenance and replacement required for operation are performed by the industrial robot 60. In terms of structure, the unit-type reactors 22 and the cartridge. type steam generators 23 are an assemblage of discrete elements suited to such a robot activity. The storage battery 62, fuel depository 63 and the like are placed in the space in which the nuclear reactor is installed to form the robot working space 61.

In accordance with the present invention as set forth above, it is possible to realize highly reliable fast breeder reactor capable of supplying a thermal/electrical output corresponding to the required scale.

With regard to the reliability of the system in relation to society, the system functions as an assemblage dispersed subsystems and operates in a self-regulating, cooperative manner. Therefore, even if the subsystems should experience a partial failure, failure cannot lead to destruction of the overall system. Thus, the system is highly reliable and resists destruction. This makes it possible to establish a stable energy supply.

As many apparently widely different embodiments of the present invention can be made without departing from the spirit and scope thereof, it is to be understood that the invention is not limited to the specific embodiments thereof except as defined in the appended claims.

What is claimed is:

1. An autonomous, decentralized fast breeder reactor system comprising:
   a single main vessel of a nuclear reactor;
   a plurality of unit-type nuclear reactor subsystems disposed in said main vessel and each having a small-scale faster breeder reactor core;
   a plurality of steam generator subsystems disposed in said main vessel;
   a first coolant circulating naturally through the interior of said main vessel;
   a second coolant circulating naturally through the interior of each unit-type nuclear reactor subsystem; and
   means for causing a heat transfer to take place between each unit-type nuclear reactor subsystem and each steam generator subsystem by said first coolant circulating naturally through the interior of said main vessel and undergoing a heat exchange with said second coolant circulating naturally through the interior of each unit-type nuclear reactor subsystem.

2. The system according to claim 1, wherein said unit-type nuclear reactor subsystems are arranged on an inner peripheral portion of said main vessel, and said steam generator subsystems are arranged at a central portion of said main vessel.

3. An autonomous, decentralized fast breeder reactor system comprising:
   a turbine system for introducing generated steam from a steam generator subsystem, and
   a heat accumulating pool for cooling condensate of a turbine.

4. The system according to claim 3, further comprising emergency cooling means in which piping from said heat accumulating pool is connected to a central portion of a fast breeder reactor.

5. An autonomous, decentralized fast breeder reactor system, comprising an autonomous, decentralized fast breeder reactor, a turbine system for introducing generated steam from said fast breeder reactor, a heat accumulating pool for cooling condensate of a turbine, and an industrial robot for controlling said fast breeder reactor, wherein said autonomous fast breeder reactor system is located underground.

* * * * *